F. M. STOLL.
SHOCK ABSORBING MOTOR CYCLE REAR SEAT.
APPLICATION FILED OCT. 8, 1912.
1,205,489.
Patented Nov. 21, 1916.
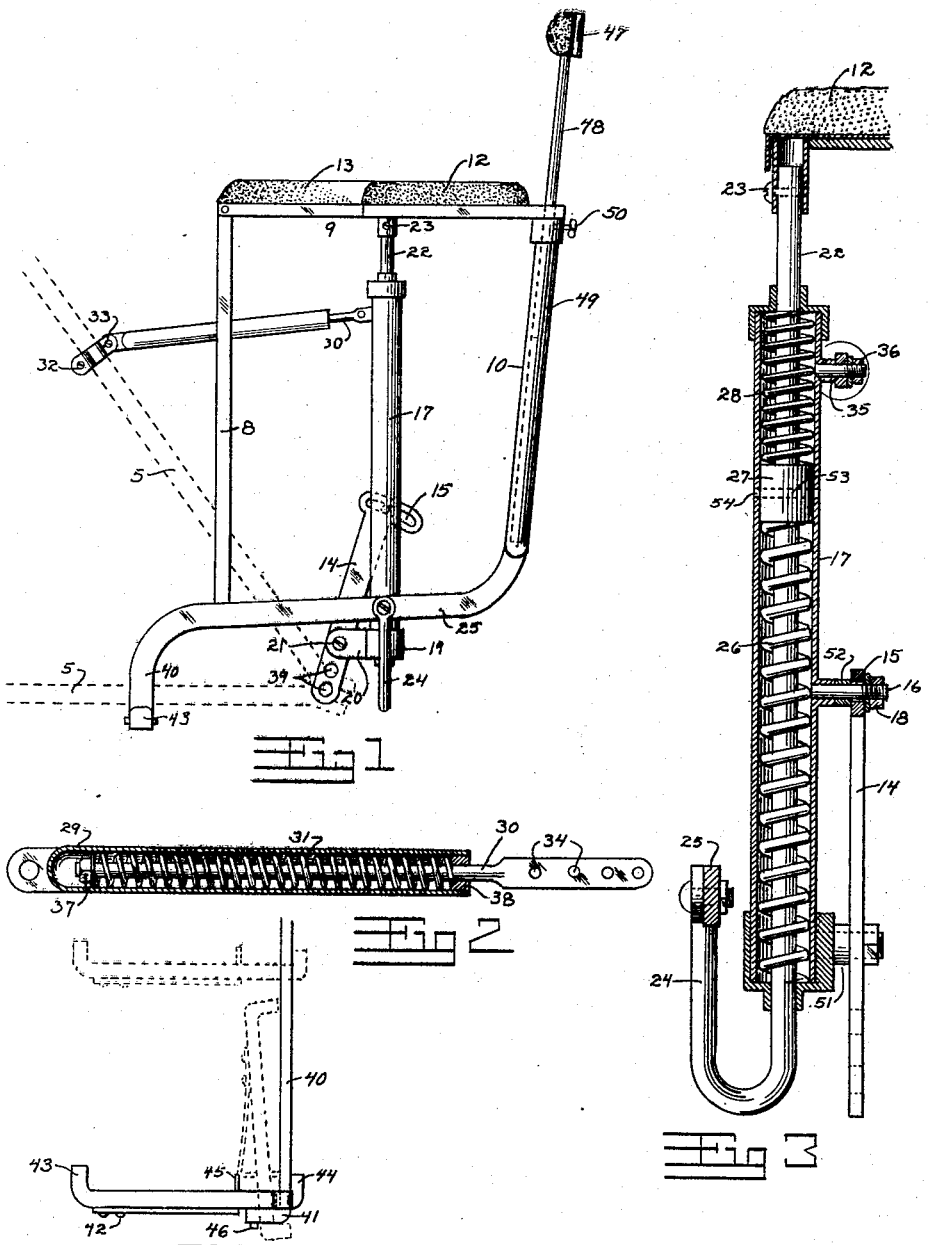

UNITED STATES PATENT OFFICE.

FRANK M. STOLL, OF DENVER, COLORADO.

SHOCK-ABSORBING MOTOR-CYCLE REAR SEAT.

1,205,489.    Specification of Letters Patent.    Patented Nov. 21, 1916.

Application filed October 8, 1912. Serial No. 724,613.

*To all whom it may concern:*

Be it known that I, FRANK M. STOLL, a citizen of the United States, residing in the city and county of Denver and State of Colorado, have invented new and useful Improvements in Shock-Absorbing Motor-Cycle Rear Seats; and I do declare the following to be a full, clear, and exact description of my invention, such as will enable others skilled in the art to which it appertains to make and use the same, reference being had to the accompanying drawing, and to the figures of reference marked thereon, which form a part of this specification.
My invention relates to improvements in shock absorbing motor-cycle rear seats and has for its object the provision of a device of this character constructed to effectively absorb all shocks and jars incident to the traveling of a motor-cycle over rough ground.

Another object of the invention is to provide a device of the character specified which is simple and inexpensive in manufacture and efficient in use.

Another object of the invention is to provide a device of the character specified provided with a foot rest which may be adjusted to suit the tastes of the rider.
In the use of my invention, many other objects and advantages embodied in the construction and the arrangement of the invention will readily appear, and I wish it understood that all such objects and advantages are anticipated and within the scope of my invention.

I will now proceed to describe my invention with reference to the accompanying drawing forming a part hereof.
In this drawing,—Figure 1 is a side elevation of my seat illustrating its application to the motor-cycle; Fig. 2 is a detail view of a cylinder and a spring actuated piston which is used as a connection between the seat proper and the motor-cycle frame; Fig. 3 is a detail view showing the manner in which the seat is yieldingly supported in position on the motor-cycle frame, the said view showing the cylinder in longitudinal section; Fig. 4 is a detail view of the adjustable foot rest.

In the drawing I have shown only one side of the frame work composing my shock absorbing motor-cycle rear seat, but it must be understood that another part, similar in all respects to the side illustrated in Fig. 1 of the drawing, is arranged on the opposite side of the rear wheel of the motor-cycle and that the two sides are connected by suitable transverse bars or braces. To show both sides of this seat would involve the necessity of making several additional views of the drawing and since merely one side of the seat will suffice to illustrate the construction and principles involved, it is not considered necessary to go into further detail with respect to the manner in which the two sides of the seat are connected together.

Corresponding and like parts are referred to in the following description and indicated in all of the views in the accompanying drawing by the same reference characters.

Let the numeral 5 designate the rear fork of a motor-cycle frame in which the rear wheel is journaled. It is understood that the rear seat is supported in position over the rear wheel of the motor-cycle. The same consists of a frame composed of members 8, 9 and 10, which members compose one side of the seat, it being understood that members corresponding in all respects are arranged on the opposite side of the wheel and form the other side of the seat. On top of the frame work, I arrange a suitable cushion 12 cut out on opposite sides of its forward part, as shown at 13, to receive the legs of the rider. To the axle of the rear wheel I secure a member 14 which is provided with a sector slot 15, receiving a pin 16 mounted upon a vertically disposed cylinder 17, the said pin being held in the slot by means of a nut 18 threaded on the outer extremity of the said pin. The lower extremity of the cylinder 17 is received in a cup shaped device 19 having an arm 20 pivoted to the member 14, as shown at 21. Through the cylinder 17 a rod 22 is passed, the upper extremity of said rod being secured to the member 9 of the seat, as shown at 23, while the lower extremity of the said rod exteriorly of the cylinder 17 is turned upwardly, forming a loop 24 and is secured to a substantially horizontally disposed part 25 of the member 10. In the cylinder 17 I arrange a spiral spring 26 which surrounds the rod 22, one extremity of the said spring engaging the lower extremity of the cylinder, while the upper extremity of the said spring is engaged by a member 27 formed upon the rod 22 within the cylinder 17. Also within the cylinder 17 surrounding the rod 22, above the member 27, I arrange an equalizing spiral spring 28, the upper extremity of said spring engaging the upper extremity of said cylinder, while the lower extremity of said spring engages the member 27. As pointed out in the foregoing, it is understood that both sides of the seat are constructed substantially the same in every respect.

From the foregoing description it will be understood that the rods 22 are permitted to slide in the said cylinder against the tension of the springs 26 and 28. The seat is therefore supported entirely by the springs 26 which absorb or take up the concussion or shocks incident to the traveling of the motor-cycle over rough ground.

In Fig. 2 of the drawing, I have shown a detail view of a cylinder and spring actuated piston, by virtue of which the seat is permitted to yield in the direction in which the motor-cycle is traveling. This cylinder is designated by the reference character 29, while the piston is designated by the reference character 30 and the spring by the reference character 31. A collar 32 is secured to the rear fork of the motor-cycle and the cylinder 29 is pivotally connected with said collar, as shown at 33. One extremity of the piston 30 is provided with a number of perforations 34, through which a pin 35, secured to the cylinder 17, is adapted to be passed, the said piston being held on said pin by means of a nut 36. The inner extremity of the piston 30 is provided with a nut 37, while the outer extremity of the cylinder 29 is provided with an inwardly extending stop flange 38, the spiral spring 31 surrounding the piston 30 and engaging the one extremity by the nut 37, while the opposite extremity of said spring engages the stop flange 38. It is understood that each of the cylinders 17 are connected by means of one of these cylinders 29 and spring actuated pistons 30.

From the foregoing description it will be understood that while the motor-cycle is traveling over rough ground the seat will yield simultaneously in a vertical and lateral direction, resulting in completely absorbing all shocks or jars incident to the traveling of the machine over rough ground. As illustrated in the drawing, the entire frame work composing the seat is pivoted as shown at 21, whereby the seat will be permitted to yield laterally or in the direction in which the machine is traveling against the tension of the spring 31, the said spring 31 always having a tendency to right the seat or to retain it in its normal position. As the seat moves laterally, the pin 16 will follow or move in the sector slot 15, the said pin, of course, limiting the lateral movement of the seat when the pin reaches the extremities of said slot.

It can be readily seen that, by virtue of the construction enabling the seat to simultaneously yield vertically and laterally, a maximum degree of shock absorption is accomplished.

Attention is here called to the fact that the member 14 is provided with a plurality of perforations 39 through which the rear axle of the motor-cycle is adapted to be passed, the said perforations permitting of adjustment of the seat with respect to the wheel of the motor-cycle.

By virtue of the fact that the lower extremity of the rod 22 is curved upwardly, as designated by the reference character 24, a path for the upward and downward play of the rod 22 is permitted without coming into contact with the lower extremity of the cylinder 17.

By referring to Fig. 1 of the drawing it will be seen that the horizontally disposed part 25 of the member 10 is provided with a depending part 40, bent outwardly at right angles, as shown at 41, and on this depending part 40 I slidably mount a foot rest 42, the depending part 40 passing through an opening formed at one extremity of said foot rest, whereby the said foot rest 42 may be moved upwardly or downwardly on the depending part 40 for the purpose of adjusting said foot rest to suit the comfort and convenience of the rider. The opposite extremities of this foot rest 42 are provided with upwardly turned parts 43 and 44, the part 44 resting against one side of the depending member 40 when the foot rest is in the operative position, and accomplishing the purpose of holding the foot rest in its adjusted position. The foot rest 42 is provided with a leaf spring 45 which operates to hold the said foot rest in the inoperative position, represented by the dotted lines. Assuming that it is desired to place the foot rest in the inoperative position, the same is turned upwardly until the part 41 is received in the opening of the foot rest, whereupon the tension of the spring will operate to push the lower extremity of the foot rest outwardly and the upper extremity of the foot rest inwardly, resulting in holding the said foot rest in the inoperative position. The part 41 is provided with a stop pin 46 which limits the movement of the lower extremity of the foot rest against the tension of the spring 45.

In connection with my shock absorbing seat, I employ an adjustable back rest 47, the said back rest being provided with an arm 48, which is slidably mounted in a hollow part 49 of the member 10, a set screw 50 passes through the hollow part 49 and is adapted to engage the arm 48 for holding the latter in its adjusted position. It is understood that the back rest proper, designated by the reference character 47, consists of a transverse cushion member near the opposite extremities on which the arms 48 are secured, there being an arm to correspond with each side of the frame composing the seat.

As a means of adjusting my improved seat to a larger width of motor-cycle frame, I employ collars or washers 51 and 52, which may be either placed on the outer or inner side of the member 14. In other words, by interposing these collars or washers 51 and 52 between the member 14 and the cylinder 17, the motor-cycle seat frame may be made to fit a relatively narrow motor-cycle frame, and by placing the said collars on the inner side of the member 14, the width or distance between the two members 14 will be extended, making the motor-cycle seat frame adapted to a relatively wider motor-cycle frame.

By referring to Fig. 3 of the drawing, it will be noted that I have formed an opening 53 through the member 27 of the rod 22, which opening is adapted to register with openings 54 formed in the cylinder 17, said openings registering when there is no weight on the seat. When these openings are thus in register, a pin may be passed through the same for holding the seat in a stationary position or for preventing the same from vibrating when not in use or carrying the rider.

While I have described and illustrated herein a specific form of my invention, it is understood that I am not limited thereto and that the same may be modified and varied without departing from the spirit of my invention or the domain of the appended claims.

Having thus described my invention, what I claim and desire to secure by Letters Patent is:—

1. A shock absorbing motor-cycle rear seat, comprising a frame, members secured to the axle of the motor-cycle, said members having sector slots at their upper extremities, cylinders pivotally connected with said members, spring actuated pistons arranged within said cylinders and supporting the said frame, the said cylinders having parts received in said sector slots of said members, and spring actuated means connecting the said frame with the frame work of the motor-cycle at angles to the said cylinders, substantially as described.

2. A vehicle seat, comprising a frame, members secured to the frame work of the vehicle and having sector shaped guides at their upper extremities, cylinders pivoted to said members, spring actuated pistons arranged within said cylinders and supporting the said frame, the said cylinders having parts received by said sector shaped guides, and spring actuated means connecting the said seat frame with the motor-cycle frame at angles to the said cylinders.

3. A vehicle seat, comprising a frame, members secured to the vehicle frame work and having sector shaped slots at their upper extremities, cylinders pivotally connected to said members, spring actuated rods arranged within said cylinders and supporting the seat frame, the cylinders having parts received in said sector shaped slots of said members, the said spring actuated rods permitting the seat to yield upwardly and downwardly, and means connecting the said seat frame with the frame work of the vehicle at angles to the said spring actuated rods, said means comprising cylinders pivoted at one extremity to the frame work of the vehicle, and spring actuated pistons arranged within the said cylinders and pivotally connected with the seat frame, substantially as described.

4. A vehicle seat, comprising a seat frame, members secured to the frame work of the vehicle and having sector shaped guides, cylinders pivoted to said members, spring actuated pistons arranged within said cylinders and supporting the said seat frame, the said cylinders having parts received by said sector shaped guides, and tension yielding means connecting the said seat frame with the vehicle frame at angles to the said cylinders.

5. A vehicle seat, comprising a seat proper, members secured to the frame work of the vehicle and having sector shaped guides, cylinders pivoted to said members, spring actuated means arranged within said cylinders, and supporting the said seat proper, the said cylinders having parts received by said sector shaped guides, and yielding means connecting said cylinders with the vehicle frame at angles to said cylinders.

6. A vehicle seat, comprising a seat frame, cylinders pivotally connected with the vehicle frame work, rods passing through said cylinders and connected at both extremities with said seat frame, means on said rods engaged by the upper extremities of said springs, the lower extremities of said rods being curved upwardly to their connecting point with said frame, and spring actuated pistons connecting the seat frame with the vehicle frame work at angles to said cylinders, whereby said seat is permitted to simultaneously yield in vertical and lateral directions.

7. A vehicle seat, comprising a seat proper, spring retaining members pivotally connected with the vehicle frame, springs retained by said spring retaining members, rods engaged by said springs and connected at both extremities with said seat proper, the lower extremities of said rods being curved upwardly to their connecting point with said seat proper, and yielding means connecting said seat in a lateral direction with said vehicle frame.

8. A vehicle seat, comprising a seat frame, spring retaining members pivotally connected with the vehicle frame, members passing through said spring retaining members and connected both at their upper and lower extremities with said seat frame, springs retained by said spring retaining members and engaged by said members which pass through said spring retaining members, and said members which pass through said spring retaining members having their lower extremities curved upwardly to their connecting point with said seat frame.

In testimony whereof I affix my signature in the presence of two witnesses.

FRANK M. STOLL.

Witnesses:
 JNO. G. POWELL,
 ALVINA HINTOMEISTER.

Copies of this patent may be obtained for five cents each, by addressing the "Commissioner of Patents, Washington, D. C."